United States Patent

Birkenbeil et al.

Patent Number: 5,534,149
Date of Patent: Jul. 9, 1996

[54] METHOD OF SEPARATING CATALYST-FREE WORKING SOLUTION FROM THE HYDROGENATION CYCLE OF THE ANTHRAQUINONE METHOD FOR THE PRODUCTION OF HYDROGEN PEROXIDE

[75] Inventors: Hans Birkenbeil, Frankfurt; Ulrich Brand, Langenselbold; Gustaaf Goor, Hanau; Wolfgang Kunkel, Frankfurt, all of Germany

[73] Assignee: Degussa Aktiengesellschaft, Frankfurt am Main, Germany

[21] Appl. No.: 406,519

[22] Filed: Mar. 20, 1995

[30] Foreign Application Priority Data

May 31, 1994 [DE] Germany .................... 44 18 931.1

[51] Int. Cl.⁶ .................... B01D 61/00; C02F 1/44
[52] U.S. Cl. .................... 210/636; 210/651; 423/588
[58] Field of Search .................... 423/588, 500.25, 423/500.26; 210/651, 636

[56] References Cited

U.S. PATENT DOCUMENTS

| | | | |
|---|---|---|---|
| 3,433,358 | 3/1969 | Herzog et al. | 210/65 |
| 4,428,923 | 1/1984 | Kunkel et al. | 423/588 |
| 5,348,657 | 9/1994 | Eickhoff et al. | 210/636 |

FOREIGN PATENT DOCUMENTS

| | | |
|---|---|---|
| 1208619 | 7/1986 | Canada . |
| 4129865 | 4/1992 | Germany . |
| 4217245 | 12/1993 | Germany . |

OTHER PUBLICATIONS

Literature Article Process Technology, vol. 26, Jun. 1992, p. 315.
Ullmann's Encyclopedia of Industrial Chemistry, Fifth Edition, vol. A13, pp. 447–457. (no date available).

*Primary Examiner*—Wayne Langel
*Attorney, Agent, or Firm*—Beveridge, DeGrandi, Weilacher & Young

[57] ABSTRACT

A method is shown for the separation of catalyst-free working solution from working solution, containing noble-metal black, especially palladium black as catalyst, of the hydrogenation cycle of the so-called anthraquinone method for the production of hydrogen peroxide by filtration of the catalyst-containing working solution using filter candles. The filter candles are formed of an open-pore support body based on a carbon material or metallic or ceramic material with an average pore width in a range of 5 to 100 μm and of a single-layer or multi-layer membrane of ceramic material with an average pore width in a range of at least about 1 up to 10 μm located on the outside surface of the support body.

8 Claims, 3 Drawing Sheets

METHOD OF SEPARATING CATALYST-FREE WORKING SOLUTION FROM THE HYDROGENATION CYCLE OF THE ANTHRAQUINONE METHOD FOR THE PRODUCTION OF HYDROGEN PEROXIDE

INTRODUCTION AND BACKGROUND

The present invention relates to a method of separating catalyst-free working solution from noble metal black catalyst-containing working solution, especially from palladium black catalyst-containing working solution in the hydrogenation stage of the so-called anthraquinone process for the production of hydrogen peroxide. The separation is carried out by filtration of the catalyst-containing working solution using filter candles.

As is known, in the so-called anthraquinone process for the production of hydrogen peroxide, also called the AO process, a reaction carrier based on one or several 2-alkylanthraquinones and tetrahydro-2-alkylanthraquinones in an organic solvent system is converted with hydrogen in the presence of a catalyst into the corresponding hydroquinone form. After the hydrogenation stage the working solution freed from catalyst is treated in the oxidation stage with an oxygen-containing gas, at which time the quinone form of the reaction carrier re-forms under formation of hydrogen peroxide. Finally, hydrogen peroxide is extracted with water from the oxidized working solution and the working solution, that is, the mixture of the reaction carrier and solvent or solvent mixture, is returned to the hydrogenation stage. Essential details of the AO process can be gathered from Ullmann's Encyclopedia of Industrial Chemistry, 5th ed. (1989), vol. A 13, pp. 447–456. See also Kirk Othmer, Encycl. of Chem. Tech. 3rd Ed., Vol. 13, pages 16 to 21 relied on and incorporated herein by reference.

Frequently, catalysts based on noble metals are used as hydrogenating catalysts, which can be carrier-bound or carrier-free suspension catalysts or fixed-bed catalysts. The cycle of the hydrogenation stage employing suspension catalysts includes essentially the actual reactor, a circulating flow line with circulating pump, a device for the supplying and distributing of the hydrogen, a device for the supplying of working solution from the working-solution drying stage which is connected in after the extraction stage. Also included is a device for the removal of catalyst-free, hydrogenated working solution, which last-named device is a solid-liquid separating device.

The quantitative retention of the suspension catalyst in the hydrogenating cycle, which is free of problems in continuous operation, and the separation of catalyst-free working solution from the latter are basic prerequisites for a reliable and economical process. The required solid-liquid separation is based on a filtration using fine-pored filters which are periodically back-flushed.

According to the method of Canadian patent 1 208 619, in the anthraquinone method for the production of hydrogen peroxide, suspension-catalysts with a particle size range of 75% greater than 1 µm such as e.g. Raney Nickel can be retained using filter elements of sintered metal particles with a maximum pore width of 8 µm. This method is not suited for separating a catalyst-free, hydrogenated working solution from a working solution containing palladium black because Pd black normally exhibits a primary particle size range between 5 and 50 nm and such a sintered-metal filter is on the one hand not tight against palladium black and on the other hand rapidly blocks up—see comparative example 3 in DE-OS 42 17 245.

According to U.S. Pat. No. 3,433,358 filter candles of carbon material, so-called carbocandles, are suitable for separating a catalyst-free, hydrogenated working solution from working solution containing Pd black, the pore width of which candles can be greater than the diameter of the Pd particles to be separated. The wall thickness of such filter candles acting on the principle of deep-bed filtration is indicated to be at least 10 mm. U.S. Pat. No. 3,433,358 does speak of a surface filtration; however, tests by applicants herein showed that a filter thickness like that in customary membrane filters would be totally insufficient in the case of carbocandles. On account of the limited mechanical stability of such carbocandles narrow limits are imposed on the design; the required filtration performance results in rather large filter housings and therewith in a high capital investment. There is an interest in more effective and more stable filter elements, especially in those with improved mechanical stability and increased filtration performance in order to increase the economy of the AO method.

Previously mentioned U.S. Pat. No. 3,433,358 also teaches that carbocandles are far superior to metallic and ceramic filter materials. This statement is also supported by DE-OS 41 29 865, which is about 25 years younger. According to it when filter elements based on a metallic or ceramic sintered product are used in generic methods utilizing palladium black (=Pd black) a special, very expensive purification method is necessary in order to render the filter element reusable and to obtain a technically acceptable filtration performance. The purification method reduces the economy of the AO method.

As is known from DE-OS 42 17 245, Pd black can also be retained in the AO method using a microfilter operated according to the cross-flow principle with a filter membrane of ceramic material with a pore width of advantageously 0.1 to 1.0 µm and catalyst-free, hydrogenated working solution can also be separated from the hydrogenation cycle.

A disadvantage in the previously cited method with cross-flow filtration technology is the fact that in practice the average pore width of the membrane is rather low, preferably between 0.1 and 0.5 µm, resulting in a limited filtration performance. In addition, it turned out when such filter elements were continuously operated that the filtration performance drops slowly but continuously, which can not be avoided by increased back-flushing.

Ceramic filter elements are presented under characteristic ID number 314 in Verfahrenstechnik 26 (1992), No. 6, 30 which exhibit asymmetric particulate ceramics. The area of use is indicated as catalyst separation and recovery, among other things in the production of hydrogen peroxide. No suggestions result either from this document nor from the manufacturer about whether the catalysts are the carrier bound noble-metal ones predominantly used in the AO method or are the non-carrier-bound noble-metal catalysts, which are considerably more difficult to filter. The filter elements presented exhibit a support body with an average pore width of 40 µm and a membrane with an average pore width of 1.5 or 3 or 5 µm. Taking into consideration the previously indicated state of the art for catalyst separation in the AO method an expert in the art would relate the "Verfahrenstechnik 26 (1992), No. 6" document only to those AO methods in which the pore width of the active filter element is approximately the same as or smaller than the particle size of the catalyst particles to be separated. An expert in the art would hardly consider the cited filter candles for AO methods using Pd black as a suitable catalyst because the pore width of the membrane (1.5 to 5 µm) is a multiple larger than the diameter of the primary particles of Pd black (5 to 50 nm) and, in addition, insufficient tightness against Pd black, a danger of blocking up and a drop in the filtration performance must be reckoned with.

SUMMARY OF THE INVENTION

An object of the invention accordingly is to provide a solution to the problem of separating noble-metal black, especially Pd black, in the AO method which overcomes the disadvantages of the known methods. Another object is to obtain greater economy, including greater filtration performance and lower susceptibility to process upsets in carrying out the AO method.

In achieving the above and other objects, a feature of the present invention resides in a method for the separation of the catalyst-free working solution from the working solution containing noble-metal black as catalyst, in the hydrogenation cycle of the anthraquinone method for the production of hydrogen peroxide. More particularly, the method of the invention features the filtration of the catalyst-containing solution circulating in the hydrogenation cycle, termed the "working solution" using filter candles which are periodically back-flushed with catalyst-free working solution or a solvent which is a component of the working solution. The candles used according to the invention are formed of an open-pore support body based on a carbon material or metallic or ceramic material with an average pore width in a range of 5 to 100 μm, and of a single-layer or multi-layer membrane of ceramic material with an average pore width in a range of at least about 1 up to 10 μm, especially 1.5 to 5 μm, located on one side of the support body.

BRIEF DESCRIPTION OF DRAWINGS

The invention will be further understood with reference to the drawings, wherein.

DETAILED DESCRIPTION OF THE INVENTION

The filters to be used in accordance with the invention and formed of a support body, are preferably made of ceramic material, especially such as aluminum oxide or silicon carbide and exhibit an average pore width in the range of 5 to 100 μm, preferably, 20 to 50 μm. The ceramic membrane portion of the filter candle which is responsible for the actual filtration is quantitatively suitable for the retention of noble-metal black hydrogenation catalysts such as in particular the especially effective, extremely fine palladium black.

The membrane is exclusively formed of a suitable ceramic, typically formed of α-aluminum oxide, mixed oxides containing $SiO_2$ and $Al_2O_3$ or zirconium oxide and exhibit an average pore width in the range of at least about 1 and up to about 10 μm, preferably 1.5 to 5 μm. The membrane is selected so that its average pore size is less than that of the support material so that the catalyst containing liquid will be filtered and the catalyst will be caught by the membrane.

It has been surprisingly found that the filtration with the filter candles to be used in accordance with the invention and with retention of the tightness of the filter against Pd black can be operated with a considerably greater specific filtrate flow ($m^3$ working solution per $m^2$ of filter area ● hour) than was possible using the previously known carbocandles. When standardizing the specific filtrate flow to the element pressure loss the specific filtration performance of the preferred filter candles to be used in accordance with the invention is more than four times as high as that using conventional carbocandles. This increases the economy of the AO method because at a given installed filter area the performance can be raised or at a given filter performance the filter area required for it and the dimensioning of the apparatus can be reduced as compared to the state of the art. As a result the investment volume of a system and the expenses for the amount of working solution and noble-metal Pd black located in the filter unit can be lowered.

Figure 1:
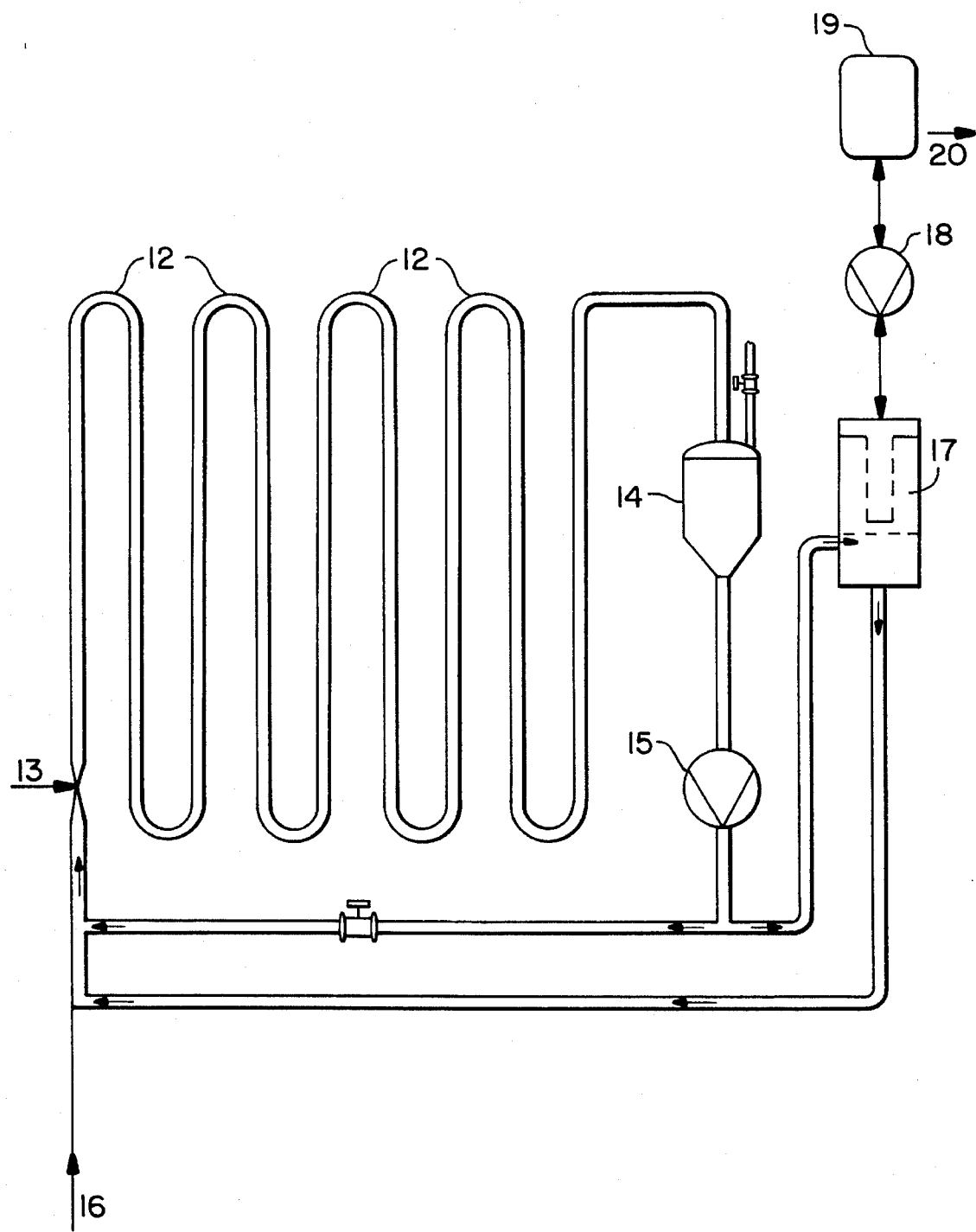
FIG. 1 is a flow diagram of the hydrogenation cycle in the process of making hydrogen peroxide according to the anthraquinone process.

As shown in FIG. 1, the hydrogenation step in the AO process can be carried out with a sequence of equipment which is of generally conventional design and layout. A tube reactor 12 is arranged in a loop with a source of hydrogen 13. The content is conveyed to separator 14 by means of reactor circulating pump 15. The circulating liquid, called working solution is introduced at 16. The composition thereof is well known in the art and includes at least one anthraquinone compound; i.e 2-ethylanthraquinone and/or tetrahydro-2-ethylanthraquinone. The filter container 17 is fitted with the one or more candles (not shown). Back flush pump 18 operates to flush out the filter container 17. Via the oxidizer feed tank 19 the hydrogenated working solution 20 is conveyed to the oxidation stage.

A further advantage of the method of the invention resides in the greater operating safety because the filter candles to be used in accordance with the invention are more stable mechanically. Hence, candle breakage during assembly and due to operational pressure surges can be avoided to a greater extent than is the case with carbofilter candles. Finally, the filter candles of the invention can be manufactured in a larger size than the previously known carbofilter candles, which results in a lesser assembly expense for the installation of a certain filter area.

Moreover, it could not have been foreseen that in the method of the invention using filter candles with a support body and a membrane of ceramic material with quantitative retention of the catalyst a considerably greater filtration performance is achieved with simultaneous preservation of the same in continuous operation over several months than is the case in the previously known method using a micro-filter operated according to the cross-flow principle with a filter membrane of ceramic material (DE-OS 42 17 245). Whereas in the previously known cross-flow filtration method on a production scale the average pore width of the ceramic membrane of the microfilter preferably had to be between 0.1 and 0.5 μm, the filters used in the method of the invention with a membrane having a pore size ten times greater surprisingly proved to be completely tight against passage of Pd black.

Figure 2:
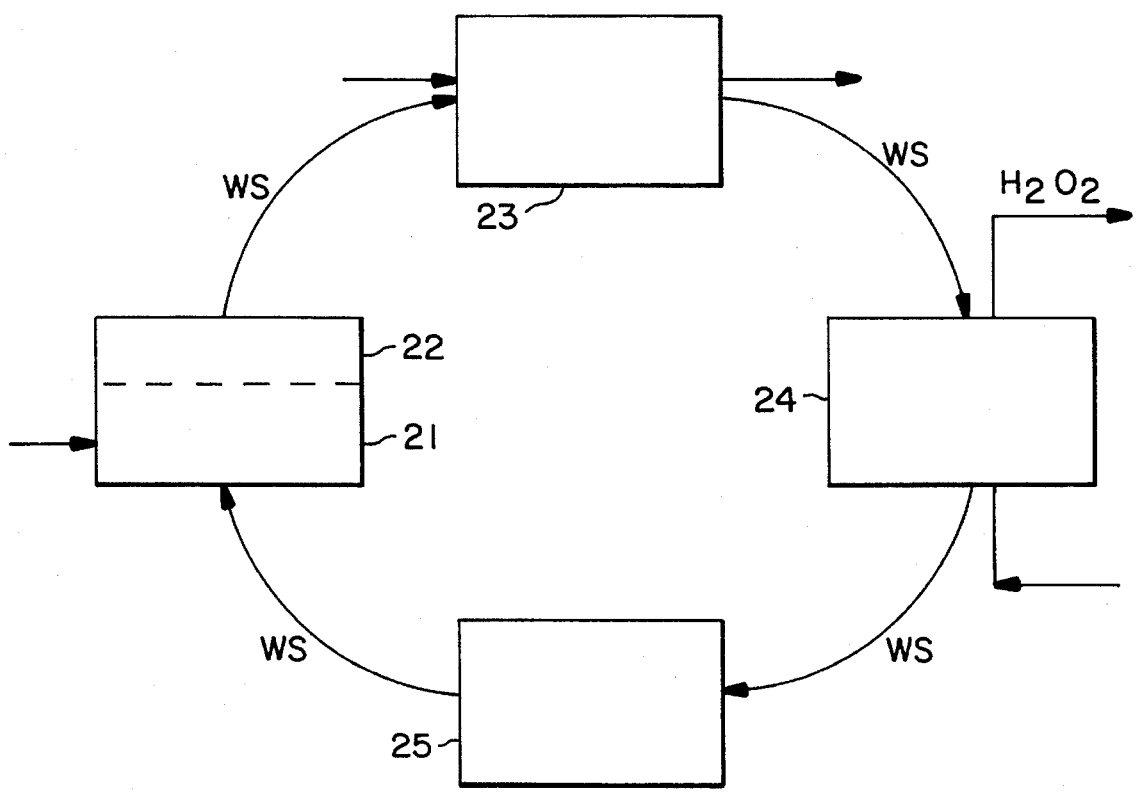
FIG. 2 is a schematic flow diagram of the overall process of the invention.

The schematic overall flow diagram is shown in FIG. 2 and includes the hydrogenation stage 21 where hydrogen is introduced, the main filtration stage 22, the oxidation stage 23, the extraction stage 24 and the drying stage 25. Air is introduced into the oxidation stage and off gas is vented. The working solution "ws" circulates in the circulation system. A source of demineralized water can be connected to stage 24 from which an aqueous $H_2O_2$ is obtained.

The filter candles to be used in accordance with the invention have a design customary for filter candles. In general, the membrane of the filter candle is on the side of the candle which is in contact with the working solution containing the catalyst. For example, it is on the exterior side of the support and can be in the form of a jacket, cladding, or sleeve that fits over the support. The wall thickness of the support body of the filter candles suitable for industrial use in the AO method is usually in a range between about 5 and 15 mm, especially about 10 mm but this is not narrowly critical. The length of the filter candles can be selected within broad ranges; filter candles with a length between 50 and 150 cm are especially useful. The filter candles are arranged in a known manner in a filter housing and the filter candle and housing comprise the necessary supply and removal lines for the catalyst-containing working solution and the catalyst-free working solution.

As concerns the material for the support body of the filter candle it can be a material based on essentially carbon or also a ceramic or metallic material. Oxide, silicate and carbide ceramic materials are preferred; $SiO_2$, sintered glass, aluminum oxide, zirconium dioxide ceramics, cordierite ($Al_2O_3 \cdot SiO_2 \cdot MgO$) and silicon carbide are cited by way of example. These are all conventional materials well known in the art. The average pore width of the support body, determined using a capillary flow porometer, is generally in a range between 5 and 100 μm, preferably between 20 and 50 μm. The porosity of preferred filter candles, which is primarily influenced by the support body, is generally between 30 and 40%.

These are materials that are well known in the art and any suitable carbon, metallic or inert ceramic material can be used for this purpose as will be apparent to those skilled in the art.

The membrane of the filter candle is formed of a suitable ceramic material, preferably of essentially α-aluminum oxide, or a mixed oxide can be used. Most preferably, one based on the inclusion of $SiO_2$ and $Al_2O_3$, or zirconium oxide can be used. The average pore width of the membrane, determined using a capillary flow porosimeter, is in the range of at least about 1 up to 10 μm. Membranes with an average pore width in a range of at least about 1 to 5 μm, especially of 3 to 5 μm are preferred. The average pore width of the membrane is less than the average pore width of the support body in order to retain the catalyst filtered out. The thickness of the membrane can be within broad ranges, usually between 5 and 100 μm.

Figure 3:
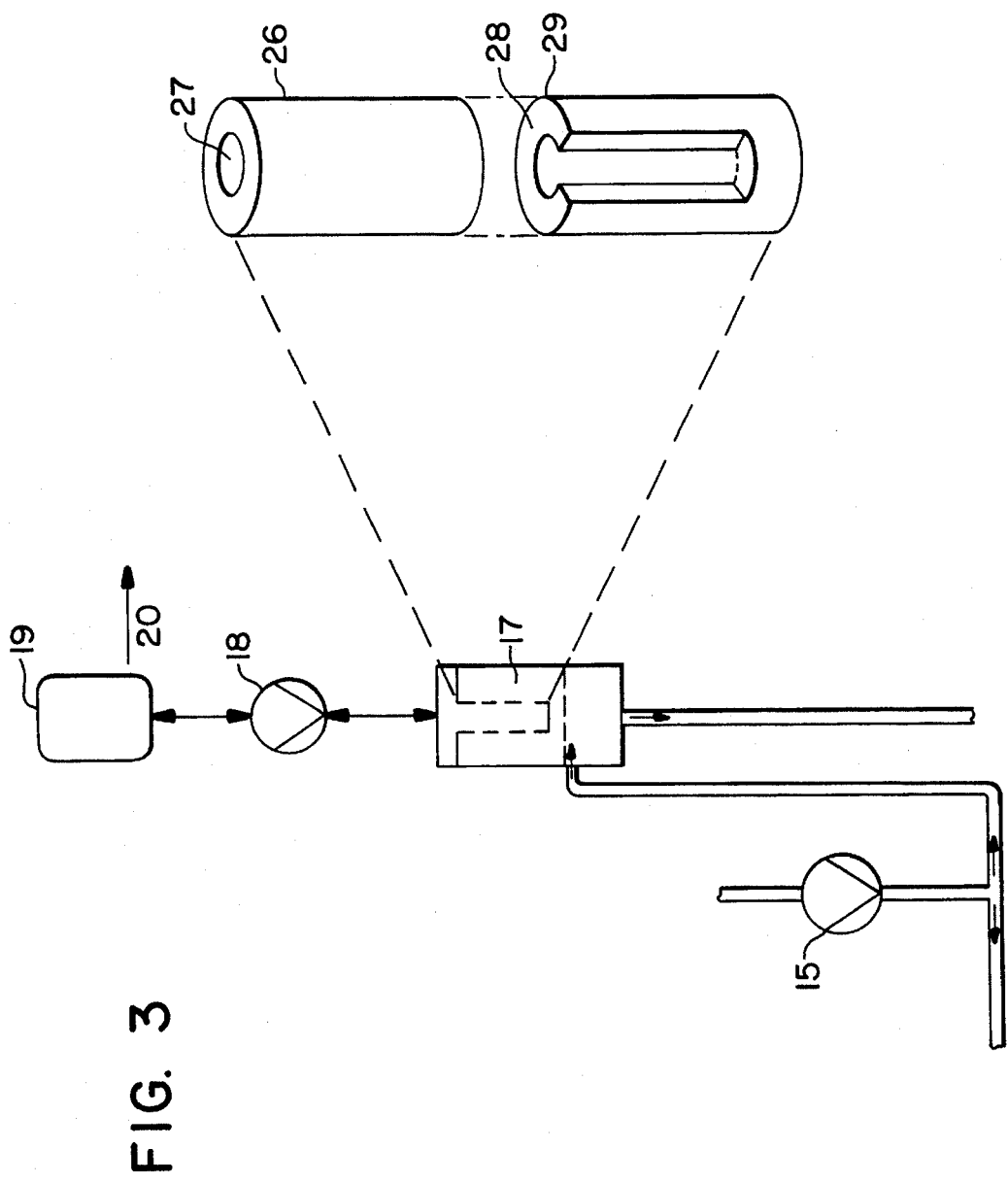
FIG. 3 is a schematic partial sectional view of a filter candle employed in accordance with the present invention.

FIG. 3 shows a schematic partial section of a typical filter candle and its location in the arrangement of equipment according to the invention.

The filter candle 26 is a symmetrical cylindrical body with constant diameter and a central bore hole 27 parallel with the major axis thereof. The cylinder is made of carbon, metallic material, or preferably the ceramic support material 28 and has the membrane 29 located on the exterior surface. The flow in operation of the system is with the catalyst containing working solution from the exterior of the filter candle to the interior so that the catalyst is retained on the outside surface of the filter candle. In the back flush step, the catalyst free working solution streams from the inside to the outside. Filter candles are described in general in Kirk Othmer, Encyl. of Chem. Tech. 3rd Edition, Vol. 10, page 321 to 326 relied on herein and incorporated by reference. The terms "filter candle" and "filter cartridge" are used interchangeably in the art.

In the method of the invention the filter candles are periodically back-flushed in order to return the amount of catalyst separated on the surface of the membrane with the working solution back to the hydrogenation cycle. The method thus comprises periods for the actual filtering and periods for the back-flushing process. The filtration times and back-flushing times are readily determined by orienting tests within the skill of the art. The filter candles can be back-flushed well in a known manner. Aside from a blackening by the catalyst (palladium black) the elements tested proved to be totally free of adhering matter after several months of operation. After a usual start-up phase of the filter candle no pressure drop can be determined during their further operation-filtration with periodic back-flushing. The filtration performance is distinguished by a very stable, high level. For the purpose of back-flushing the pressure between the retentate side and the permeate side of the filter candle is reversed. In general the catalyst-free working solution is used for back-flushing; however, if required the solvent or solvent mixture contained in the working solution can be used for back-flushing.

The measures of the invention for separating a catalyst-free working solution from a working solution containing a noble-metal black can be readily realized in all known AO methods using noble-metal black, especially palladium black. For example, working solutions can be used which contain different reaction carriers or reaction-carrier mixtures. The method of the invention is also not limited as regards the selection of the solvents and solvent mixtures of the working solution. Thus, the solvent systems of U.S. Pat. No. 4,428,923 and U.S. Pat. No. 3,423,176 are cited in this regard for the carrying out of the hydrogenation stage. These patents are relied on and incorporated herein for their entire disclosure. Although working solution hydrogenated in a customary manner is drawn from the catalyst-containing hydrogenation cycle via the filter candles, the method of the invention can also be used with working solutions which are not hydrogenated or only partially hydrogenated.

The invention is explained further in the following examples and reference examples.

EXAMPLES B1, B2, B3 AS WELL AS REFERENCE EXAMPLE VB1

The separation of catalyst-free working solution from catalyst-containing working solution of the hydrogenation cycle was investigated in a small pilot plant for the production of hydrogen peroxide according to the anthraquinone method using carbofilter candles (VB1) and filter candles to be used according to the invention and consisting of a ceramic support body with a ceramic membrane (B1, B2, B3) under comparable operating conditions.

The working solution contained 2-ethylanthraquinone and 2-ethyltetrahydroanthraquinone as reaction carrier and contained as solvent a mixture of essentially aromatic hydrocarbons with a boiling range of 185° to 205° C. and of a tetraalkyl urea. Palladium black was used as catalyst in a concentration of approximately 0.7 g/l and 1.4 g/l. The hydrogenation was carried out in a device in accordance with U.S. Pat. No 4,428,923 so that the $H_2O_2$ equivalent after the hydrogenation was approximately 10 g/l.

The carbofilter candle used in VB1 were in the form of a hollow cylinder with a length of 100 mm. The filter candles of the invention in B1, B2 and B3, also in the form of a hollow cylinder, had the same length. The support body in B1 and B2 consisted essentially of silicon carbide with an average pore width of approximately 40 μm; the membrane of the outside of the filter candle was based on a mixed oxide (e.g. $3Al_2O_3 \cdot 2SiO_2$) with a pore width of 3 μm (B1) and 5

μm (B2). In example B3 the support body consisted essentially of α-$Al_2O_3$ and the membrane on the outside of the filter candle was based on α-$Al_2O_3$ with a pore width of 3 μm. The filters were back-flushed every 15 minutes for 10 to 20 seconds with catalyst-free working solution. The engineering data follows from table 1:

TABLE 1

|  | B 1 | B 2 | B 3 | VB 1 |
|---|---|---|---|---|
| Filter surface per main filter (outer area of candle) | 0.019 $m^2$ | 0.019 $m^2$ | 0.019 $m^2$ | 0.022 $m^2$ |
| Average filter pressure difference (during the filtration phase) | 40–80 kPa | less than 40 kPa | 30–70 kPa | 150–230 kPa |
| Average spec. filtrate flow | 1.1 $m^3/m^2 \cdot h$ | 1.1 $m^3/m^2 \cdot h$ | 1.1 $m^3/m^2 \cdot h$ | 1.0 $m^3/m^2 \cdot h$ |
| Duration of test periods | 3 weeks | 3 days | 7 days | 10 days |

It is to be noted that the pressure in the comparative example (VB1) was considerably greater than in the examples of the invention (B1–3). Also, the filtrate flow rate was slightly less. The lower differential pressure in the examples of the invention has the advantage that the specific flow can be increased.

The performance data as a function of the concentration of Pd and the forward flow of the working solution when using the filter candles of the invention of B1 follows from table 2:

TABLE 2

| Pd black content of working solution (g/l) | 0.7 | | 1.4 | |
|---|---|---|---|---|
| Flow of working solution (l/h) | Spec. filtrate flow ($m^3/m^2 \cdot h$) | Filter pressure difference (kPa) | Spec. filtrate flow ($m^3/m^2 \cdot h$) | Filter pressure difference (kPa) |
| 40 | 1.09 | 40 | 1.09 | 35 |
| 80 *) | 2.17 | 70 | 2.17 | 95 |

*) Frequency of back-flushing doubled

Table 2 also shows that in accordance with the invention, a doubling of the specific flow does not increase the differential pressure as much as in the comparative example.

After the end of the testing the filter candles in B1, B2 and B3 were completely free of adhering matter. The filter candles in B1, B2, B3 and VB1 proved to be completely tight against Pd black and the filtrate side was free of Pd particles.

EXAMPLES B4, B5 AND B6 AS WELL AS REFERENCE EXAMPLE VB2

The following filter candles were built into a filtration testing apparatus:

B4: Construction and average pore width analogous to B1,

B5: Support body of $Al_2O_3$ and membrane of α-$Al_2O_3$; average pore width of the membrane 1.5 μm, B6: Support body of $Al_2O_3$ and membrane of α-$Al_2O_3$; average pore width of the membrane 3 μm, VB2: Construction and pore width analogous to VB1.

6 liters of a mixture of aromatic hydrocarbons (boiling point 185°–205° C.), which is the main component of a typical working solution, were pumped around in the cycle via the test filter equipped with the particular element. The initial liquid flow was approximately 10 $m^3$ solution per $m^2$ filter area and hour. Test palladiums with a BET surface (measured with $N_2$ according to DIN 61131 (edition 7/1993)) of: a) 17 $m^2/g$, b) 86 $m^2$ were charged into the cycle solution. The amount of Pd black was 6 g in each test run so that a concentration of 0.5 g/liter resulted.

100 ml of the filtrate was checked in each test run for freedom from catalyst 1 and 2 minutes after addition of the test Pd black. To this purpose the filtrate sample is filtered a second time by way of a paper filter with a rating <1 μm. If a grey coloring can be recognized on the paper and 30% by weight $H_2O_2$ poured onto the filter decomposes immediately, the filtrate is not free of catalyst.

It turned out that all test palladiums used, both of the carbofilter candles (VB2) and of the ceramic filter candles of the invention, are quantitatively retained. These examples show that the palladium catalyst with low as well as high specific surface area is retained by all these filters.

EXAMPLES B7 AND REFERENCE EXAMPLE VB3

In each test run a partial flow of the catalyst-containing, hydrogenated working solution, containing 2-ethylanthrahydroquinone and 2-ethyltetrahydroanthrahydroquinone, aromatic hydrocarbons and trioctylphosphate as well as palladium black was filtered over a six-month test period parallel to and adjacent to each other in a production unit for producing hydrogen peroxide according to the anthraquinone method using a filter (VB3) equipped with carbofilter candles and using a filter (B7) equipped with ceramic filter candles to be used in accordance with the invention. The construction of the filter candles in VB3 and B7 corresponded to that indicated in VB1 and B1; however, the length of the carbofilter candles was 500 mm and that of the ceramic filter candles 1000 mm. The installed filter area was twice as great in VB3 as in B7. The filter operating program, which comprised the periods of filtering, back-flushing and pause, was operated in such a manner in B7 and VB3 that during the filtration period the filtered amount of Pd black per filter area was equally great in the case of B7 and of VB3; in the case of the filtrate flow selected in B7 and VB3 back-flushing was therefore twice as frequent in B7 as in VB3.

In B7 the specific filtrate flow was on the average twice as high as in VB3. Standardized to the pressure loss in the filter candles the specific filtrate flow ($m^3/m^2 \cdot h \cdot bar$) in B7 was on the average four to five times as great as in VB3.

The filtration performance of the filter candles in B7 shows no tendency to decrease during the test time; also, no blocking up was able to be determined. Under the test conditions selected in B7 and VB3 using Pd black in an amount of approximately 0.5 and 1.0 g/l the catalyst was retained on the outside of the filter candles; the filtered working solution was catalyst-free.

The slight pressure loss in B7 permits the filtrate flow to be considerably increased over that of the state of the art.

Further variations and modifications of the foregoing will be apparent to those skilled in the art and are intended to be encompassed by the claims appended hereto.

German priority application P 44 18 931.1 is relied on and incorporated herein by reference.

We claim:

1. A method for the separation of catalyst-free working solution from working solution containing noble-metal black as catalyst, obtained in the hydrogenation cycle of the anthraquinone method for the production of hydrogen peroxide comprising filtering the catalyst-containing working solution using filter candles formed of an open-pore inert support body with an average pore width in a range of 5 to 100 μm and of a single-layer or multilayer membrane of ceramic material with an average pore width in a range of at least about 1 up to 10 μm located on one side of and in contact with the support body wherein the catalyst-containing working solution passes through the membrane first.

2. The method according to claim 1 further comprising periodically back-flushing with catalyst-free working solution.

3. The method according to claim 1 wherein said support body is made of carbon, metal or ceramic.

4. The method according to claim 1, wherein said support body of the filter candle consists of ceramic.

5. The method according to claim 4 wherein said ceramic of said support body is aluminum oxide or silicon carbide, and exhibits an average pore width in a range of 20 to 50 μm.

6. The method according to claim 1 wherein the membrane consists essentially of α-aluminum oxide, mixed oxides containing $SiO_2$ and $Al_2O_3$ or of zirconium oxide and exhibits an average pore width in a range of 1 to 5 μm.

7. The method according to claim 6 wherein the membrane exhibits an average pore width in a range of 3 to 5 μm.

8. The method according to claim 1 wherein the working solution contains palladium black.

* * * * *